March 17, 1964 RYOICHIRO KITO ETAL 3,124,929
ELEMENT LINK FOR LINK CHAINS
Filed June 15, 1960
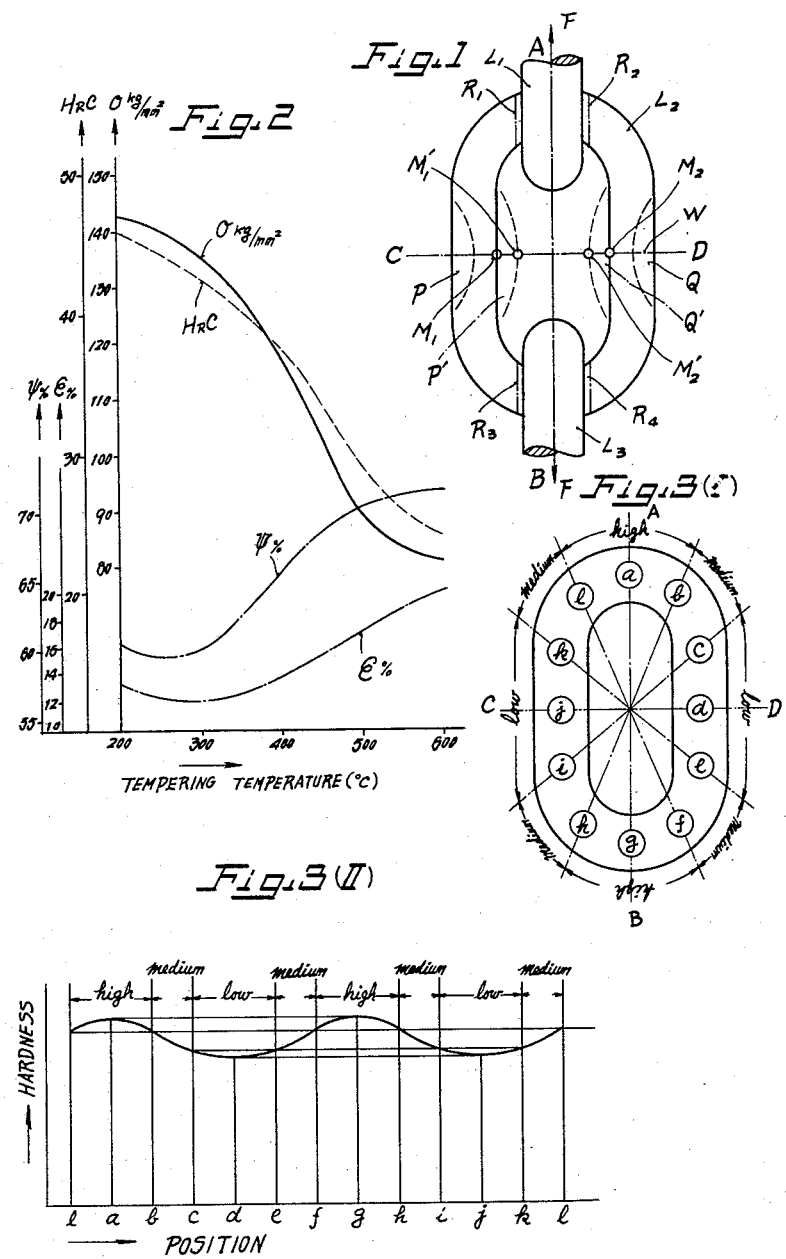
INVENTORS
RYOICHIRO KITO
TAKESHI INOMATA
NORIO KANETAKE tion of the link shown in FIG. 3(I).
3,124,929
ELEMENT LINK FOR LINK CHAINS Ryoichiro Kito, Takeshi Inomata, and Norio Kanetake, all of Tokyo, Japan, assignors to Kabushiki Kaisha Kito Seisakusho, Kanagawa-ken, Japan
Filed June 15, 1960, Ser. No. 36,189
3 Claims. (Cl. 59—90)

This invention relates to an element link for link chains of an approximately elliptical outline, an oval outline, or the like, consisting of opposed metal strips with abutting ends of opposed strips butt-welded together in a plane containing the transverse axis (minor axis in case of an elliptical outline) of the link perpendicular to the direction of a tension to which the link is to be subjected during operation.

According to this invention, the element link is made to have unequal hardnesses over its whole extent in such a manner that hardnesses of the portions of the link situated opposite in the direction of the transverse axis of the link decrease in a ratio within a determined range in comparison with those of the shoulder portions of the link, whereby the link is prevented from being broken along its welded part by a bending force acting upon the welded part, before stresses in the shoulder portions of the link reach the maximum strength of the material of the link when the link is tensioned. Thus, according to this invention defects in strength of the welded part of the link can be compensated, which link has then a reasonable strength distribution over its whole outline.

In the accompanying drawing
FIG. 1 is an elevation of a part of a link chain according to this invention,
FIG. 2 is a diagram showing characteristic curves of hardness, tensile strength, elongation and contraction of the welded part of an element link according to this invention,
FIG. 3(I) is an elevation of an element link according to this invention and
FIG. 3(II) is a diagram showing a hardness distribution of the link shown in FIG. 3(I).

Referring to FIG. 1 which is an elevation of a part of a link chain, an explanation will be given to how the element link tends to be deformed when the link is tensioned. Now, when a link chain consisting of element links $L_1$, $L_2$, $L_3$ . . . is subjected to a tension F in a direction of the longitudinal axis AB of each element link, each link, as shown by $L_2$, tends to be deformed as shown in the drawing by a broken line. (This has been proved already experimentally and can be explained theoretically.)

Namely, the element link $L_2$, which consists, in this case, of two semicircular portions (shoulder portions) and two parallel straight line portions as shown in the drawing, tends to be deformed into a cocoon contour in such a manner that the two parallel portions P, Q approach each other in the direction of the transverse axis CD, as shown by broken lines P', Q'. Therefore, the inner opposite parts $M_1$, $M_2$ of the parallel portions P, Q of the link on the transverse axis CD tend to be displaced to the points $M_1'$, $M_2'$ by being subjected to the maximum bending forces in addition to a tensile force due to the tension F, F, resulting in that the maximum bending stresses are produced in the points $M_1$, $M_2$.

On the other hand, in case of forming a chain link annularly by butt-welding, the butt-welded part of the link must lie always in a plane containing the transverse axis of the link for technical reasons, so that the butt-jointed plane W coincides with the plane containing the transverse axis CD and, thus, contains the point $M_2$, as shown in FIG. 1, which is the maximum stress point due to a bending force in case of link deformation.

The welded part of a link, however, has following defects in its strength:

(a) The base metal changes in its welded portions metallographically by local heating at a high temperature, with the result that its crystal grains become coarse and similar to those of the so-called cast structure and that the welded portions become very short of tenacity.

(b) Residual stresses are left in the welded part as a result of quenching, sudden heating and pressurizing.

(c) The inner side of the welded part (vicinity of the point $M_2$ in FIG. 1) is liable to have such surface defects that notch effects are produced by flowing-down of molten steel. When the link which has been hardened while being heated by usual radiation and convection in a heavy oil furnace or an electric furnace is tempered in a salt bath, the link is so treated thermally as to have a hardness uniform over the whole contour or as to have a hardness in its parallel portions (P, Q in FIG. 1) of a small mass effect higher than that in its curved shoulder portions and the link maintains same hardness relation after having been tempered, with the result that—

(d) The defects in strength of the welded part of the link are not compensated by usual thermal treatments (hardening, tempering) after welding, but can be even promoted under certain circumstances.

When a link having a reasonable strength distribution is broken by a tension, theoretical breaking planes or faces of the link will be those in the curved shoulder portions of the link shown in FIG. 1 by chain lines $R_1$, $R_2$ or $R_3$, $R_4$.

Actually, however, every welded link as mentioned above is broken under action of a tension along its butt-welded plane W shown in FIG. 1. Reasons therefor would be obvious from the foregoing explanations. Namely, any link subjected to a tension tends to be deformed into a cocoon shape, with the result that the inside point $M_2$ of the butt-welded plane W of the link becomes the maximum bending stress point on one hand, while the vicinity of this point $M_2$ is most liable to be broken as mentioned in the foregoing items (a–d), on the other hand.

Furthermore, experiments have proved that when a thermally treated link is broken under a tensile load in one of its shoulder portions, the parallel portions of the link are subjected to tensile loads amounting to only about 75% of the material strength of the link resistance to breaking. This means that the link need not have an equal strength or an equal hardness over its whole contour, or, in other words, that it is necessary for the shoulder portions, i.e., curved portions of the link to impart to them a sufficient hardness in order to give them a necessary rigidity, while a diminution of the tensile strength of each of the parallel portions to about 75% of that of each of the shoulder portions results in no wise a diminution of a proper strength of the link utilizable practically.

As shown in FIG. 2, which shows characteristic curves of hardness ($H_RC$), tensile strength ($\sigma$), elongation ($\epsilon$) and contraction ($\psi$) of the welded part of an element link of a link chain with respect to tempering temperatures, the welded part of an element link decreases in tensile strength and hardness, but increases in elongation and contraction of area, with rise of its heat treating or tempering temperature. A bending test of the welded part of the link which has been treated thermally, has shown experimentally that the overall strength or a capacity of the welded part capable of being deformed in response to stresses (in other words, a quantity of energy which is absorbed by a material till the material is broken in case of bending of the material) increases steeply at tempering temperatures higher than 400° C. Namely, by increase in the above mentioned capacity, the welded part, even when it has surface defects to induce various notches, can decrease in its notch effect widely with avoidance of a stress concentration, and an excessive increase in bending stress against bending of the link material can be prevented, too.

This invention is derived from the above mentioned knowledges and considerations.

FIG. 3 shows a hardness distribution of an element link according to this invention. As shown in FIG. 3(I) the link according to this invention has a high hardness in each of its shoulder or end portions $l$–$a$–$b$ or $f$–$g$–$h$ through which the longitudinal axis A–B passes, a low hardness in each of its parllel portions $c$–$d$–$e$ or $i$–$j$–$k$, and the lowest hardness in the plane containing the transverse axis CD (i.e., the butt-welded plane). The high hardness of the shoulder portions changes gradually to the low one of the parallel portions and vise versa, as shown in FIG. 3(II).

In order to obtain a link according to this invention, the link is heat treated first at a low temperature as to possess a high hardness over the whole body of the link in order to impart to its shoulder portions a rigidity and an abrasion resistance, and then the link is again so heat treated at a high temperature as to have low hardnesses in each of its parallel portions, within such a range that the tensile strength of each of the parallel portions of the link is lowered down to about 75% of that of the shoulder portions of the link, in order to impart to the parallel portions, especially to the welded part, an increasing capacity of deformation in response to a bending force. The link treated thermally in the above mentioned manner has a hardness distribution as shown in FIG. 3.

An example of a link chain which is formed in accordance with a prior art welding procedure would be one made of stel containing 0.22% carbon and 1.2% Mn having a diameter of ⅜ of one inch. A link of this nature was welded, hardened, and after hardening, was again tempered at a temperature of 1750° F. and finally at a temperature of 400° F. The link, after finishing, was then subjetced to a tensile strength, whereupon it ruptured at its welded part during the tension test at a strength of about 6–9 tons.

According to the present invention, the same link was additionally treated at a temperature of 840° F. by electrical resistance heating applied by means of electrodes to cause the hardness of the portions adjacent the weld to become lower and thus the tenacity to become increased. The link thus produced was subjected to tensile strength and a rupture occurred only after being subjected to between 13–14 tons.

The process in which the hardness of the parallel portions of the link adjacent the welding thereof may be lowered can be performed by tempering, such as by flame heating, or by high frequency induction heating.

From the foregoing one can understand easily that the link according to this invention possesses a necessary rigidity and abrasion resistnace in its shoulder portions because of having a sufficiently high hardness in these portions, while it can not be broken without reason along the welded plane by a bending force due to its deformation in case of being subjected to a tension because of having a low hardness in its portions opposite in the direction of its transverse axis and that, nevertheless, the low hardness of each of the opposite portions is still sufficient to maintain in those portions a necessary tensile strength. Therefore, accoridng to this invention there can be avoided such defects of any conventional link chain that when the link chain is tensioned the welded part of any of the element links of the chain can be broken by a bending force exerted upon it before stresses in the shoulder portions of the link reach the maximum strength of the material of the link.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a hardened and tempered link for link chains, comprising: a pair of opposite curved shoulder end portions and substantially straight side portions with at least one of said side portions being formed by separate legs welded together along a welded joint which is located in a central portion of the link between the end portions and substantially transverse to the longitudinal axis thereof, the improvement comprising a central portion of the link between the end portions and having a welded joint being of a hardness lower than said shoulder end portions, the ratio of the hardness of said central portion to said shoulder end portions being such that the tensile strength of the chain in the central portion is at least as great as the end portions.

2. A link for link chains comprising a pair of opposed metal profiles each having two ends, respective abutting ends of said opposite profiles being butt-welded together at a joint located in a central plane at substantially right angles to the longitudinal axis therof, said link having rounded end portions of a greater hardness than the side portions for abrasion resistance, the hardness being gradually reduced from a maximum at the rounded end portions to the welded joints, the hardness of corresponding portions of each side of the link being similar and the reduction of the hardness adjacent the welded joint being such that the tensile strength of the chain in the vicinity of the weld is at least as great as each end of the link.

3. A link for link chains comprising opposed metal profiles each having two ends, respective ones of which are butt-welded together in the transverse plane of the link, said links including rounded end portions and substantially straight side portions, said side portions being of a tensile strength of about 75% of the tensile strength of the rounded portions, the hardness being gradually reduced from a maximum at the rounded end portions toward the butt-welded ends in a symmetrical manner and the reduction of the hardness adjacent the welded joint being such that the tensile strength of the chain in the vicinity of the weld is at least as great as each end of the link.

References Cited in the file of this patent

UNITED STATES PATENTS

| | | |
|---|---|---|
| 385,385 | Thomson | July 3, 1888 |
| 1,466,257 | Talley | Aug. 28, 1923 |
| 1,613,726 | Sanford | Jan. 11, 1927 |
| 1,739,522 | Reyburn | Dec. 17, 1929 |
| 2,103,972 | Harris | Dec. 28, 1937 |
| 2,144,319 | Taylor | Jan. 17, 1939 |
| 2,162,229 | Remington | June 13, 1939 |
| 2,164,474 | Schaefer | July 4, 1939 |
| 2,247,837 | Gordon | July 1, 1941 |
| 2,256,455 | Crawford | Sept. 16, 1941 |
| 2,327,129 | Ronan | Aug. 17, 1943 |
| 2,693,673 | Lutts et al. | Nov. 9, 1954 |

FOREIGN PATENTS

| | | |
|---|---|---|
| 15,848 | Great Britain | of 1913 |